Figure 1:
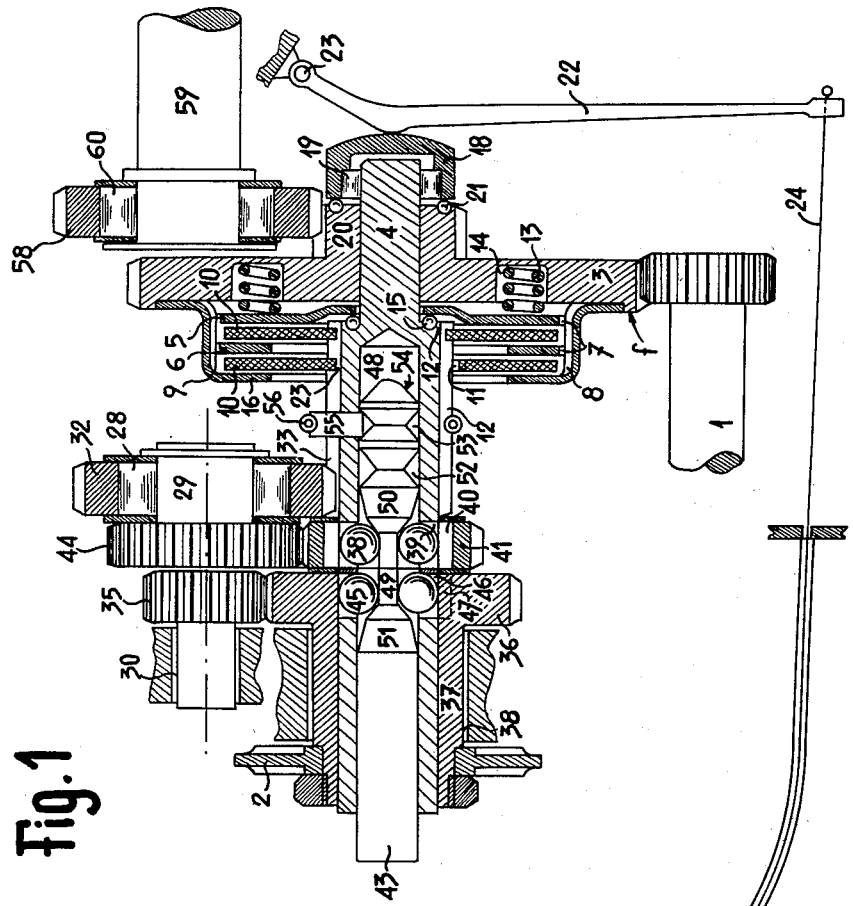

April 15, 1952 H. E. VIOLET 2,592,982
TRANSMISSION
Filed Feb. 3, 1949 2 SHEETS—SHEET 1

INVENTOR
Hans E. Violet.
BY
ATTORNEY

April 15, 1952
H. E. VIOLET
2,592,982
TRANSMISSION
Filed Feb. 3, 1949
2 SHEETS—SHEET 2
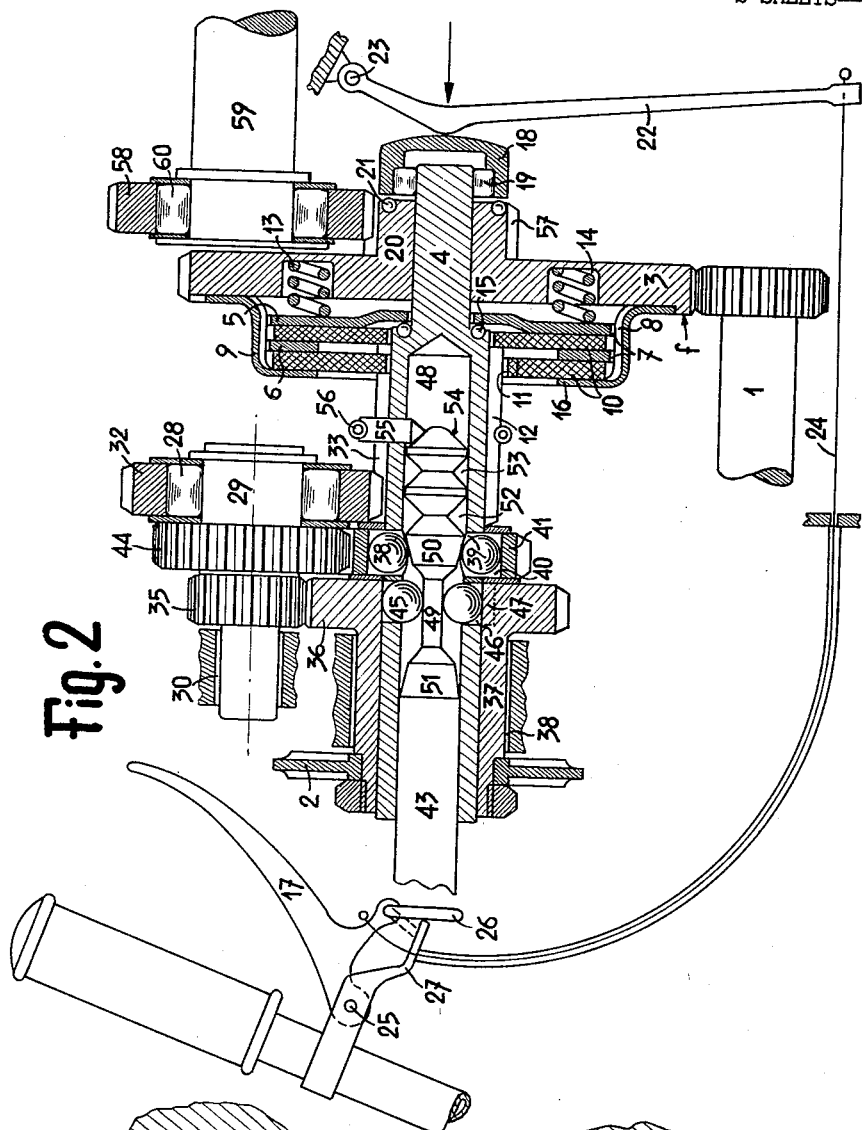
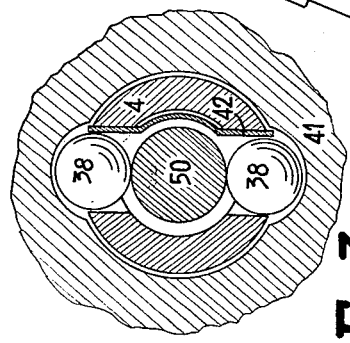
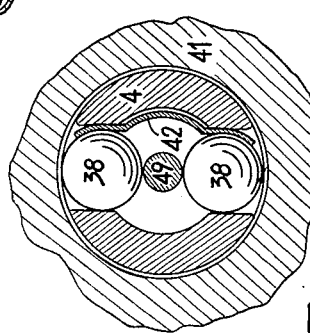
INVENTOR
*Hans E. Violet.*
BY 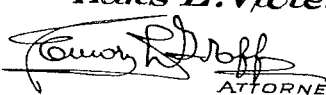
ATTORNEY Patented Apr. 15, 1952

2,592,982

UNITED STATES PATENT OFFICE 2,592,982

TRANSMISSION

Hans Edouard Violet, Zurich, Switzerland, assignor to Sotecom S. A., Geneva, Switzerland, a corporation of Switzerland Application February 3, 1949, Serial No. 74,295
In Switzerland May 16, 1947

5 Claims. (Cl. 74—372)

At the present time, the mechanical transmission devices between a driving part and a driven part and including a gear box enabling one to modify the transmission ratio still offer certain drawbacks which are due to their very design.

Generally speaking, the gear boxes used for transmitting the driving torque to the wheels of a vehicle such as a motor cycle include parallel gear trains connected to a driving shaft by sliding gears enabling one to choose the desired transmission ratio. In a gear box of this kind, the selection device has a neutral position in which the mechanical connection between the driving and the driven parts is interrupted. But this said position is often badly defined, so that there is a risk for the user to let go the clutch controlling part interposed between the driving part and the gear box, whilst a gear is still in mesh, thus causing a sudden coupling which may be the cause of an accident or of a damage to certain parts of the gear box.

Moreover, when the vehicle is running and the user desires a change in the transmission ratio, he is compelled to interrupt the mechanical connection between the driving part and the gear box by means of the clutch, then to operate a selection device. Now, he cannot engage a gear so long as the gears which are to be brought in mesh do not revolve at approximately the same speed. The result is a loss of time which may compel the user to go back to the low gear. This is specially the case when gear shifting takes place on an upward grade.

The present invention relates to a device for transmitting the driving torque to the wheels of a vehicle, particularly to the wheel of a motor cycle, including a gear box fitted with a selection device enabling one to choose the desired transmission ratio.

This device aims at doing away with the mentioned drawbacks by the fact that it includes a selection device constituted on one hand, by a one-way coupling interposed between two organs of the lowest transmission ratio and, on the other hand, by individual meshing devices of each of the other transmission ratios, these meshing devices being operated by a controlling organ, so that, for every position of the latter corresponds a transmission ratio, and by the fact that it has but one interruption point of the mechanical connection between the engine and the wheels, realized by a clutch, the engagement and disengagement positions of which are operated by a controlling organ.

The attached drawing shows diagrammatically and by way of example a form of execution of the transmitting device which is the object of the invention.

The Fig. 1 is a cross-section view, the clutch being in the disengaged position and the gear box organs in a position giving the lowest transmission ratio.

The Fig. 2 is a view similar to that of Fig. 1, the clutch being in the engaged position and the gear box organs in a position corresponding to a medium transmission ratio.

Figure 5:
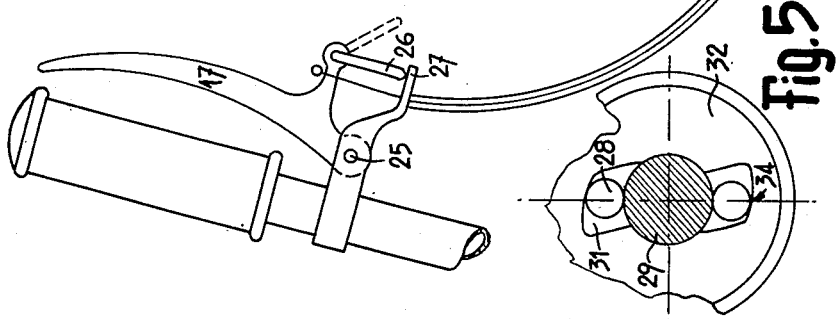

The Figs. 3 to 5 are detail views.

In the form of execution shown by the drawing, the transmitting device includes a driving part 1 connected to the engine (which is not represented) and a driven part 2 connected to the wheel (not represented) of the vehicle. This part 2 is constituted by a sprocket connected to the driving wheel by means of a chain.

The driving part 1 constituted by a driving shaft, carries a pinion meshing with a gear 3 revolving freely on a main shaft 4. The latter is mechanically connected, on one hand to the gear 3 by means of a clutch, and on the other hand, to the driven part 2 by means of a gear box.

The clutch includes discs 5, 6 having on their periphery some notches 7 engaged in ribs 8 of a driving part 9 rigidly fastened on the face f of the gear wheel 3 situated in front of the gear box.

Some discs 10 having an axial drilling provided with cuttings 11, are engaged on a part of the main shaft 4 provided with ribs 12. Some springs 13 resting on the bottom of housings 14 made in the gear wheel 3 tend, on one hand, to keep the disc 5 in contact with a ball thrust bearing 15 resting on a shoulder of the main shaft 4 and, on the other hand, to keep the discs 5, 6 and 10 applied one against each other, thanks to a flange 16 fixed to the driving part 9.

The engagement and disengagement of the two parts of the clutch are effected by axial displacements of the gear wheel 3 operated by a controlling organ 17. For this purpose, the end of the main shaft 4 carries an operating part 18 pivoting by means of a ball bearing 19, which can slide along the said shaft 4.

This operating part rests on the front face of the hub 20 of the gear wheel through a ball thrust bearing 21. The displacements of the operating part are controlled by a control lever 22 pivoting at 23 on a fixed part and of which one of the ends is connected by a cable 24 to the controlling organ 17. The latter includes a sprag 26 pivoting on one of its ends, and intended to rest on a rest part 27 fastened to a fixed part.

The gear box diagrammatically shown on the drawing includes three speeds, that is to say three mechanical linkages having different transmission ratios and connecting the shaft 4 to the driven part 2. A selection device enables one to choose the desired transmission ratio, that is to say to transmit the driving torque through the desired mechanical connections.

This selection device includes:

(a) a one-way coupling interposed between two of the parts of the mechanical connections presenting the lowest transmission ratio;

(b) individual meshing devices of each of the other mechanical connections the positions of which are defined by an operating part.

The one-way coupling shown by way of example on the attached drawing, includes jamming organs 28 constituted by rollers rolling on an auxiliary axle 29 pivoting at one of its ends in a bearing 30. These rollers are placed in housings 31 (Fig. 5) provided in a pinion 32, which is in mesh with a pinion 33 cut on the shaft 4. These housings open on an inside drilling of the pinion 32 and have a variable depth, their bottom 34 being constituted by a portion of a cylinder which is not concentric with the axis of the pinion 32. The auxiliary shaft 29 carries a pinion 35 rigidly fastened on it and in mesh with a gear 36 freely revolving on the main shaft 4. This gear 36 carries a hub with an extension 37, pivoting in a bearing 38. Axial stops can be provided in addition, in order to secure the axial position of the gear 36 with respect to the shaft 4. Finally, the driven part 2 is fixed rigidly on the end of the hub 37.

The meshing device of the mechanical linkage having a medium transmission ratio includes, on one hand, some locks constituted by balls 38 housed in radial drillings 39 of the shaft 4 and, on the other hand, housings 40 made radially in a pinion 41 freely revolving on the shaft 4. The housings open on the central drilling of the said pinion 41 and are arranged in relative positions corresponding to the relative positions of the radial drillings 39.

In the represented form of execution, the meshing device includes two balls 38 housed in drillings situated on a same diameter. These balls 38 are kept in a withdrawn position inside the shaft 4 and in contact with an operating organ 42 by means of a spring (Figs. 3 and 4).

The pinion 41 is in mesh with a cog 44 rigidly fastened on the auxiliary shaft 29 which is itself mechanically connected to the driven part 2 as above described.

The meshing device of the mechanical connections presenting the highest transmission ratio is similar to that above referred to and described and includes balls 45 placed in radial drillings made in the shaft 4, housings 47 made in the pinion 36 and a spring 42.

The operating part 43 is constituted by a rod which is mechanically connected to an operating organ (which is not represented) and sliding in an axial drilling 48 made in the shaft 4. This rod has a shank 49 of a smaller diameter and of sufficient length, so that the balls 38 and 45 of the two meshing devices can be simultaneously in contact with it. The diameter of this shank is such that the sum of the diameters of the two balls and of the portion 49 is smaller than the diameter of the shaft 4. At each end of this portion 49, the rod 43 has conical parts 50, 51 and at its end, it has two grooves 52, 53 having inclined walls.

Finally, its extreme front face 54 has a conical shape. These grooves, 52, 53 and this front face 54 are intended to act in conjunction with a spring catch 55 sliding in a radial drilling of the shaft 4 and subjected to the action of an annular spring 56. These grooves and this front face, together with the spring catch, constitute a blocking device securing the positions of the operating organ 43 corresponding to each of the different transmission ratios between the shaft 4 and the driven part 2.

The operation of the transmission device described is as follows:

By acting on the controlling organ 17 and by bringing it in the position represented on Fig. 1, the user provokes an axial displacement of the gear wheel 3 against the action of the springs 13. The discs 5, 6 and 10 being no longer pressed one against the other, can then be displaced angularly one with respect to the others. Thus, in this position of the controlling part 17, the clutch is in the disengaged position, so that the main shaft cannot be driven by the driving part 1. The user has the possibility of fixing this position of the controlling organ by causing the sprag 26 to rest on the stop 27 (position shown in plain lines on Fig. 1).

The engine running, the driving part is driven and revolves, so that, in order to start, all the user has to do is:

(1) to place the operating part in the position shown on Fig. 1 corresponding to the lowest driving speed of the driven organ 2;

(2) to release gradually the controlling organ 17 in order to provoke the gradual engagement of the discs 5, 6 and 10.

One sees that this clutch then drives the shaft 4, which drives the driven part by means of the pinions 33 and 32, of the one-way coupling, of the auxiliary shaft and of the pinions 35 and 36. Indeed, an angular displacement of the cog 32 in the direction of the arrow (Fig. 5) provokes the jamming of the rollers 28 between the bottom 34 of the housings 31 and the peripheral surface of the auxiliary shaft and, consequently, the driving of the latter. The operating part 43 is kept in axial position by the spring catch 55 engaged in the groove 53. For this position of the operating organ the balls 38 and 45 of the meshing devices of the two other speeds are in the withdrawn or retracted position inside the shaft 4. They are kept in this position against the action of the centrifugal force by the springs 42.

To shift to second or medium speed, one only has to displace the operating organ towards the left side of the drawing until it reaches the position shown on Fig. 2 and defined by the spring catch 55 acting in conjunction with the face 54.

When the vehicle is running and a torque is transmitted from the driving shaft 1 to the driven organ 2 by means of the pinion 32 and of the auxiliary shaft 29, the pinion 41 revolves more slowly than the shaft 4. The consequence is that, at the beginning of the displacement of the part 43, the balls 38 are pushed by the conical face 50 against the inside wall of the hub of the pinion 41. Then, as soon as the housings 40, as a result of the relative angular displacement between this pinion 41 and the shaft 4, are situated on the same lines as the drillings 39, the balls 38 are pushed inside the housings 40 and fasten the pinion 41 to the shaft 4. From then on, the torque is transmitted to the driving pinion 2 by means of the pinions 41 and 44, the auxiliary shaft 29, the pinions 35 and 36 and finally by the hub 37. The shaft 29 driven by the pinion 44 revolves more quickly than the pinion 32 driven by the pinion 33.

The relative displacement between the latter and the shaft 29 then provokes the releasing of the jamming organs 28 and therefore the interruption of the mechanical connection between the pinion 32 and the auxiliary shaft 29.

In order to shift to the third (or top) gear, for which the driven part 2 is driven at the highest speed, all one has to do is to displace the operating part towards the right side of the drawing beyond the position shown on Fig. 1. During the first part of this displacement, the balls 38 are brought back inside the shaft 4 by their pushing back springs 42 which tend to keep them in contact with the operating organ against the action of the centrifugal force. When the spring catch 55 falls into the groove 53, the parts of the gear box have the relative positions shown on Fig. 1 and which correspond to the lowest transmission ratio; then, during the second part of the displacement of the operating part 43, the conical wall 51 tends to push away the balls 45. The pinion 36 revolving more slowly than the shaft 4, when the housings 47 made radially in its axial drilling are situated in front of the radial drillings 46, the balls 45 are pushed into these housings and achieve the connections of the shaft 4 to the pinion 36.

The driven organ 2 is then driven at the same speed as the shaft 4. The part 43 is secured in its axial position by the spring catch 55 engaged in the groove 52.

From above explanations and by examining the drawing, one can see that in order to shift from one gear to another, it is not necessary to disengage the clutch. One is thus able to perform the gear shifting with extreme ease and quickness. Indeed, shifting from a higher to a lower gear can be effected at any moment and instantaneously. With the described transmission device, it is not necessary, as it is the case with other devices generally used, to wait or to cause two geared parts of the gear box to revolve synchronically in order to allow their meshing in.

Therefore, the shifting from one gear to another is extremely quick and can be effected without any loss of time.

In addition, from the constructive point of view, the described transmission device is of a very simple design, so that its cost price is very low. To each of the three positions of the operating part 43 corresponds a transmission ratio between the driving shaft 1 and the driven part 2. The controlling part of the operating organ 43 has no neutral position in which the connection between the driving part and the driven part would be interrupted, as it is the case with all known transmission devices. This interruption is rendered unnecessary by the use of a one-way coupling inserted between two organs of the lowest transmission ratio. It follows that the described transmission device has but one point of interruption realized by the clutch. This arrangement enables one to simplify the construction so that the clutch discs 5, 6 and 10 can be mounted on the side of the gear wheel 3 on which are placed the gear box parts enabling one to modify the transmission ratio between the driving part 1 and the driven part 2 so that the opposite side of this gear wheel can, as is shown on the drawing, have a pinion 57, cut on the hub 20 and meshing with a pinion 58 connected to an operating shaft 59 carrying a kick-starter (which is not represented). The mechanical connections between the pinion 58 and the shaft 59 is achieved by means of a one-way coupling including jamming organs 60.

This one-way coupling is in all respects similar to that realizing the mechanical connections between the pinion 28 and the auxiliary shaft 29. Thus, in order to start the engine, the user operates the shaft 59 by means of a control part (which is not represented), thereby automatically causing the connections of this shaft 59 to the pinion 58 by jamming the rollers 60. This pinion 58 drives directly the driving part 1 by means of the gear wheel 3. As soon as the driven organ is driven by the engine 1, the latter drives the pinion 58 at a speed greater than the speed which the user can impart to it by means of the starting crank. In consequence, the relative displacement between this pinion 58 and the shaft 59 provokes the automatic release of the jamming parts 60 and the interruption of the mechanical connections between the starting crank and the gear wheel 3.

This arrangement of the starting organs for the engine is a very advantageous one, since it permits a simple and cheap construction, whilst ensuring an absolutely safe operation.

A form of execution of the transmission device has been described here by way of example and with reference to the attached diagrammatical drawing, but it is obvious that all the described parts and elements can be simply replaced by their mechanical equivalents. Thus the one-way couplings could also be constituted by ratchets acting in conjunction with a pinion wheel. The balls 38 and 45 could also be replaced by organs sliding in their housings and operated by the operating organ against the action of their pushing back springs. One could also provide a positive drive of the locks of the meshing devices, that is to say to connect them with the operating part in such a way that the latter forces their displacements in the two directions.

I claim:

1. In a transmission especially for motor vehicles particularly motorcycles, the combination, comprising, a driving shaft having a pinion, a rotatable main shaft, a gear meshing with the driving shaft pinion rotatable and axially slidable on the main shaft and urged to a predetermined position thereon, a multi-disc clutch carried by the gear and inoperative in the first position thereof and in a second position thereof clutching the gear to the main shaft, control means operable to move the gear from the first to the second position, a second pinion rigid with the main shaft, a third pinion rotatable on the main shaft, a second gear rotatable on the main shaft, a driven member rigid with the second gear, an auxiliary shaft, a fourth and fifth pinion rigid with the auxiliary shaft and meshing respectively with the second gear and third pinion, a sixth pinion rotatable on the auxiliary shaft, and meshing with the second pinion rigid with the main shaft, an overruning clutch coupling the sixth pinion to the auxiliary shaft, operable means in the main shaft for locking the third pinion to the main shaft, operable means in the main shaft for locking the second gear to the main shaft, latch means in the main shaft and urged to latching position, and a control member within the main shaft and including recesses receiving both locking means in inoperative position, the control member being movable to a second position placing the first locking means in operative position locking the third pinion to the main shaft and the control member being also movable to a third position placing the second locking means in operative position locking the second gear to the main shaft and the first locking means being in inoperative position.

2. The combination according to claim 1 and wherein the multi-disc clutch includes a driving part attached to the gear and having ribs and some of the discs have peripheral ribs engaging the first ribs.

3. The combination according to claim 1 and wherein the control member has three notches and also comprising latch means engageable in any of the notches and holding the control member in one of its positions.

4. The combination according to claim 1 and also comprising an engine starting pinion meshing with the first gear, a second shaft rotatable in the starting pinion, a second overrunning clutch coupling the starting pinion to the second shaft.

5. The combination according to claim 1 and wherein the discs of the clutch are arranged on one side of the first gear and the second, third, fourth, fifth and sixth pinions and second gear are arranged on the same side, and the engine starting pinion on the opposite side of the first gear.

HANS EDOUARD VIOLET.

REFERENCES CITED

The following references are of record in the file of this patent:

UNITED STATES PATENTS

| Number | Name | Date |
|---|---|---|
| 1,102,427 | Morgan | July 7, 1914 |
| 2,044,217 | Kovar | June 16, 1936 |

FOREIGN PATENTS

| Number | Country | Date |
|---|---|---|
| 507,571 | France | Jan. 26, 1920 |
| 583,099 | France | Oct. 25, 1924 |
| 696,466 | France | Dec. 31, 1930 |
| 811,083 | France | Apr. 6, 1937 |